United States Patent
Lee et al.

(10) Patent No.: US 8,837,858 B2
(45) Date of Patent: Sep. 16, 2014

(54) APPARATUS AND METHOD FOR CORRECTING IMAGE DISTORTION OF REAR CAMERA

(71) Applicants: Hyundai Motor Company, Seoul (KR); Kia Motors Corporation, Seoul (KR)

(72) Inventors: Joong Ryoul Lee, Gyeonggi-do (KR); Kap Je Sung, Gyeonggi-do (KR); Jun Sik An, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 13/692,164

(22) Filed: Dec. 3, 2012

(65) Prior Publication Data

US 2014/0010474 A1     Jan. 9, 2014

(30) Foreign Application Priority Data

Jul. 9, 2012   (KR) .......................... 10-2012-0074668

(51) Int. Cl.
    *G06K 9/40*     (2006.01)
    *G06T 5/00*     (2006.01)
(52) U.S. Cl.
    CPC ..................................... *G06T 5/001* (2013.01)
    USPC ....................................................... 382/275
(58) Field of Classification Search
    USPC ............................ 382/115, 118, 275; 340/451
    See application file for complete search history.

(56) References Cited

U.S. PATENT DOCUMENTS

| | | | | |
|---|---|---|---|---|
| 5,027,104 A | * | 6/1991 | Reid | 340/541 |
| 2011/0034176 A1 | * | 2/2011 | Lord et al. | 382/275 |

FOREIGN PATENT DOCUMENTS

| | | |
|---|---|---|
| JP | 2008061260 A | 3/2008 |
| JP | 2010-003014 A | 1/2010 |
| KR | 10-2006-0041116 | 5/2006 |
| KR | 10-2009-0021627 | 3/2009 |
| KR | 2011-0002688 A | 1/2011 |
| KR | 2011-0132835 A | 12/2011 |
| KR | 10-2012-0012272 | 2/2012 |

* cited by examiner

*Primary Examiner* — Duy M Dang
(74) *Attorney, Agent, or Firm* — Edwards Wildman Palmer LLP; Peter F. Corless (57) ABSTRACT

An apparatus for correcting image distortion of a rear imaging device including analyzing, by a processor, a characteristic of a imaging device installed in a rear of a vehicle; setting, by the processor, a plurality of tilting angles for a plurality of photographed areas of a virtual imaging device corresponding to the rear imaging device from a characteristic value of the imaging device; generating, by the processor, a correction model by applying the plurality of tilting angles for the plurality of photographed areas of the virtual imaging device; tilting, by the processor, the virtual imaging device based on the correction model; performing, by the processor, a view conversion on an image photographed through the rear imaging device according to the plurality of set tilting angles for the plurality of photographed areas of the virtual imaging device to generate a corrected image; and outputting, by the processor the corrected image.

18 Claims, 7 Drawing Sheets

APPARATUS AND METHOD FOR CORRECTING IMAGE DISTORTION OF REAR CAMERA

CROSS-REFERENCES TO RELATED APPLICATIONS

This application claims under 35 U.S.C. §119(a) priority to Korean patent application No. 10-2012-0074668 filed on Jul. 9, 2012, the disclosure of which is hereby incorporated in its entirety by reference.

BACKGROUND OF THE INVENTION

1. Field of the Invention

The present invention relates to an apparatus and a method for correcting image distortion of a rear imaging device, and more particularly, to an apparatus and a method for correcting image distortion of a rear imaging device, which generates a correction model for image correction by applying a tilting angle of a virtual imaging device set according to a plurality of photographed areas depending on a characteristic value of a rear imaging device, and corrects the distortion of the photographed image of the rear imaging device based on the correction model.

2. Description of the Related Art

A rear imaging device of a vehicle provides a image of a rear area which may not be visible to a driver. In particular, the rear imaging device provides the driver with information covering a wider area using a wide-angle lens or a fish-eye lens with a large angle of view. The wide-angle lens has a substantially shorter focal distance than that of a standard lens and has an angle of view of about 60 through 120 degrees. The fish-eye lens as an ultra wide-angle lens has an angle of view of about 180 degrees or more. In particular, the fish-eye lens is manufactured so that uniform brightness and sharpness are maintained with respect to the overall angle of view of about 180 degrees or more by generating a cylinder-shaped distortion. The fish-eye lens photographs an object focusing on the center of the object and distorts the surrounding areas. In other words, the fish-eye lens may obtain an image of a wide area. In particular, with regards to a vehicle, much more information of the rear area of the vehicle may be provided to a driver by using the fish-eye lens. In addition, when the fish-eye lens is applied to an image phone, it may be possible to capture a wide viewing angle at a short distance.

However, an image photographed through a rear imaging device having a wide-angle lens or a fish-eye lens may be distorted. In particular, a degree of the distortion may be increased from the center of the image toward a periphery thereof. Accordingly, the distorted image provided through the rear imaging device does not accurately depict the photographed area. Thus, the driver may not correctly recognize the state of the rear of the vehicle.

As a method of correcting such lens distortion, a correction lens may be installed to correct the lens distortion or a software may be used to correct the distorted image. Since installing an additional correction lens may increase a manufacturing cost of the imaging device conventionally the software method has been used.

In the related art, it may be possible to select a grid type test pattern and to manually correct a distortion correction coefficient of an imaging device until the distortion-free image is displayed. In other words, changing a contour of the image by radially dragging the corner of the test image from the center of the image and correcting contents of the changed image are repeatedly performed until the distortion is removed. In another related art, the distortion-corrected image may be obtained from the distorted original image by setting a lens distortion variable while receiving any image and increasing or decreasing a range of the distortion variable of the image.

However, according to conventional technology for geometric distortion correction of a digital image, the driver must manually correct the distortion correction coefficient.

SUMMARY OF THE INVENTION

The present invention provides an apparatus and method for correcting image distortion of a rear imaging device, which may generate a correction model for image correction by applying an imaging device characteristic value depending on optical characteristic of an image photographed through a rear imaging device and installation characteristic of the rear imaging device, and correct image distortion of the rear imaging device by applying the photographed image to the correction model.

The present invention further provides an apparatus and method for correcting image distortion of a rear imaging device, which may minimize a dead zone of the rear imaging device and may expand the visible area of a driver by dividing the photographed area of a virtual imaging device corresponding to a rear imaging device into a plurality of areas and setting tilting angles for the divided areas.

According to an embodiment of the present invention, an apparatus for correcting image distortion of a rear imaging device is provided. The apparatus may include plurality of units executed by a processor within a controller having a memory. The plurality of units include: a tilting-angle setting unit which analyzes a characteristic of an imaging device installed in a rear of a vehicle and sets a plurality of tilting angles for a plurality of photographed areas of a virtual imaging device corresponding to the imaging device from a characteristic value of the imaging device; a correction model generating unit which generates a correction model by applying the tilting angles for the photographed areas of the virtual imaging device; an image correction unit which tilts the virtual imaging device based on the correction model and performs view conversion on a image photographed through the imaging device according to the set tilting angles for the photographed areas of the virtual imaging device to generate a corrected image; and a image output unit which outputs the corrected image generated by the image correction unit.

Each of the tilting angles may be an angle tilted in an upward direction (−) or downward direction (+) from a horizon when a direction parallel to the horizon is set to a 0 (zero) degree.

The tilting-angle setting unit, based on a preset reference angle, may fix, by the processor, a tilting angle for an upper fixed area to the reference angle, and variably set a titling angle for a lower variable area within a range between the reference angle and a preset maximum angle.

When setting the tilting angle of the variable area, the tilting-angle setting unit may classify, by the processor, the variable area into a plurality areas in a vertical direction and increase the tilting angle from an upper side of the variable area toward a lower side thereof.

The correction model may have a classified shape according to the photographed areas of the virtual imaging device and may store in a memory at least one setting value of a pixel value and the tilting angle of the photographed area corresponding to each area.

The characteristic value of the imaging device may include at least one of a position at which the imaging device may be disposed, a photographed direction, a focal distance for a lens of the imaging device, an angle of view, and an optical central point.

According to another embodiment of the present invention, a method for correcting image distortion of a rear imaging device is provided. The method may include analyzing, by a processor, a characteristic of an imaging device installed in a rear of a vehicle and setting, by the processor, a plurality of tilting angles of a plurality of photographed areas of a virtual imaging device corresponding to the imaging device from a characteristic value of the imaging device; generating, by the processor, a correction model by applying the tilting angles of the photographed areas of the virtual imaging device; tilting, by the processor, the virtual imaging device based on the correction model and generating a corrected image by performing view conversion on a image photographed through the imaging device according to the set tilting angles of the photographed areas of the virtual imaging device; and outputting, by the processor, the corrected image generated in the generating a corrected image.

Each of the tilting angles may be an angle tilted in an upward direction (−) or downward direction (+) from a horizon when a direction parallel to the horizon is set to a 0 (zero) degree.

The setting of the plurality of tilting angles may include, based on a preset reference angle, fixing, by the processor, a tilting angle for an upper fixed area to the reference angle, and variably setting a titling angle for a lower variable area within a range between the reference angle and a preset maximum angle.

When setting a tilting angle of a variable area, the setting tilting angles may include classifying, by the processor, the variable area into a plurality areas in a vertical direction, and setting the tilting angle to be increased from an upper side of the variable area to a lower side thereof.

According to the exemplary embodiments, the correction model for image correction may be generated, by the processor, by applying a characteristic value depending on the optical characteristic of an image photographed through a rear imaging device and the installation characteristic of the rear imaging device, and the distortion of the photographed image may be corrected by applying the photographed image to the correction model.

In addition, according to the exemplary embodiments, the photographed area of the virtual imaging device corresponding to the rear imaging device may be classified, by the processor, into a plurality of areas and the tilting angles of the areas may be set. Furthermore, the virtual imaging device may be tilted, by the processor, according to the areas depending on the set tilting angles. Therefore, bending of the horizon in a horizontal direction, or a line component of the horizontal direction may be corrected to minimize a distortion of a vertical object, and a field of vision of the outer portion of the original image may be widened to minimize the dead zone.

BRIEF DESCRIPTION OF THE DRAWINGS

The objects, features and advantages of the present invention will be more apparent from the following detailed description in conjunction with the accompanying drawings, in which.

DETAILED DESCRIPTION

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to various exemplary embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
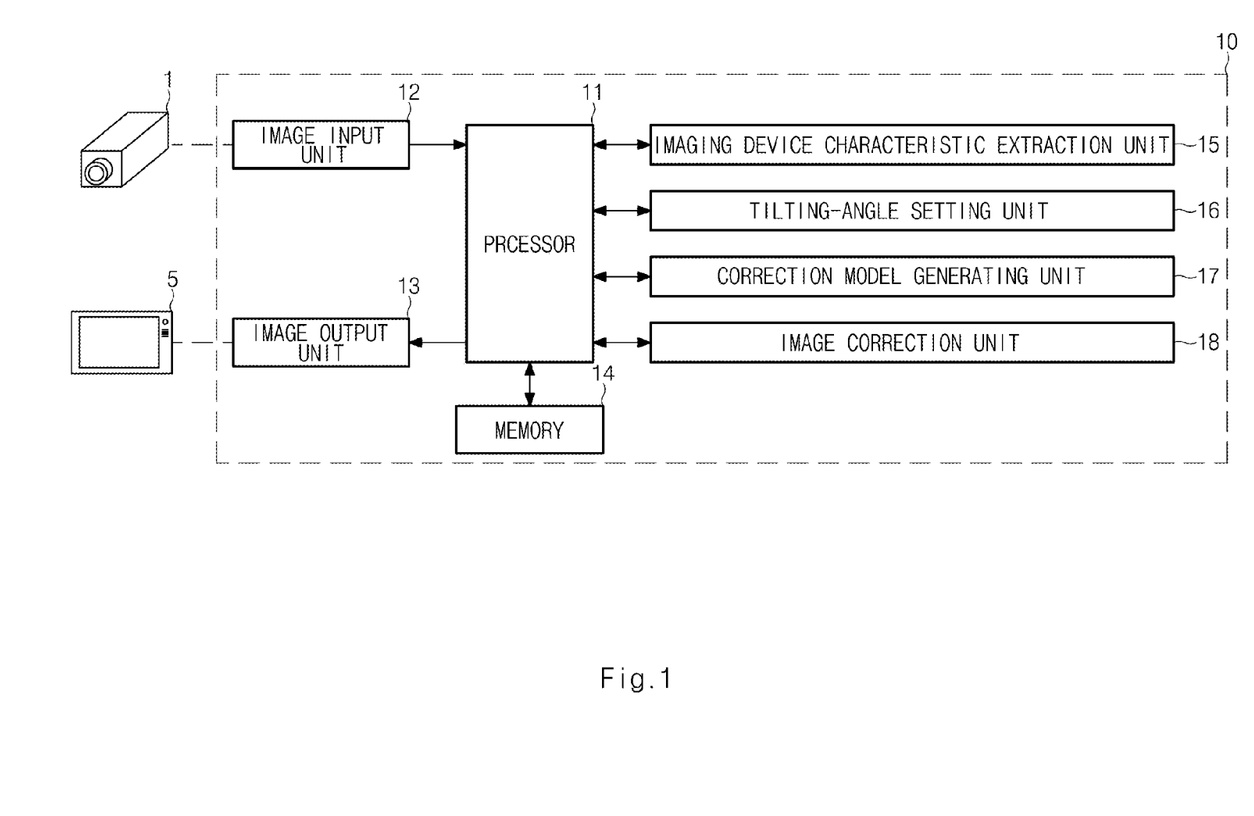
FIG. 1 is a block diagram illustrating a configuration of an apparatus for correcting image distortion of a rear imaging device according to an exemplary embodiment of the present invention.

FIG. 1 is an exemplary block diagram illustrating a configuration of an apparatus for correcting image distortion of a rear imaging device according to the present invention.

Referring to FIG. 1, an apparatus for correcting image distortion of a rear imaging device (hereinafter, referred to as image distortion correction apparatus) according to an exemplary embodiment may include a plurality of units executed by a processor 11 within a controller 10 having a memory 14. The plurality of units may include: an image input unit 12, an image output unit 13, an imaging device characteristic extraction unit 15, a tilting-angle setting unit 16, a correction model generating unit 17, and an image correction unit 18. The processor 11 may control an operation of each of the units of the image distortion correction apparatus.

The image input unit 12 may be connected to an imaging device disposed in a rear of a vehicle, in other words, a rear imaging device 1 may capture an image in real time wherein the image input unit may collect, by the processor, the image. The image inputted through the image input unit 12 may be an original image photographed through the rear imaging device 1.

The image output unit 13 may be connected to a display unit 5 such as a monitor or a navigation system disposed in the vehicle to output, by the processor a corrected image generated by the image correction unit 18 to the display unit 5.

The memory 14 or the controller 10 may store characteristic information of the rear imaging device 1 installed in the vehicle, a correction coefficient and a setting value for correcting image distortion. In addition, the memory 14 may store the correction model generated through the correction model generating unit 17.

The imaging device characteristic extraction unit 15 may analyze, by the processor, a characteristic of the imaging device attached to the rear of the vehicle based on a preset mathematical model and may extract a characteristic value of the imaging device.

When extracting the characteristic value of the imaging device, the imaging device characteristic extraction unit 15 may extract, by the processor, the characteristic value of the imaging device by considering the installation characteristic of the imaging device (e.g., direction coordinates (x, y, z), and the like for an imaging device installation location and a photographed direction) and an optical characteristic (e.g., an angle of view of a lens of the rear imaging device, a focal distance, an optical central point, and the like). The extracted characteristic value of the imaging device may be used for generating a virtual imaging device corresponding to the imaging device and setting tilting angles of photographed areas of the virtual imaging device.

The tilting-angle setting unit 16 may set, by the processor, the tilting angles of the areas of the virtual imaging device by applying the characteristic value of the imaging device, which is extracted in the imaging device characteristic extraction unit 15.

The photographed areas of the virtual imaging device may be classified, by the processor, into an upper fixed area and a lower variable area based on a preset reference angle, and the variable area may be further classified into a plurality of areas.

Moreover, the tilting angle may be an angle tilted in an upward direction (−) or a downward direction (+) with respect to a horizon when a direction parallel to the horizon set a 0 (zero) degree.

The tilting-angle setting unit 16 may set, by the processor, the tilting angle of the fixed area to correspond to the preset reference angle and may set the tilting angle of the variable area to a value within a range from the reference angle to a preset maximum angle. The reference angle may be set to a value of a range from −10 degrees to 5 degrees. However, it is not limited thereto. Hereinafter, an exemplary embodiment illustrates that the reference angle is set to 0 (zero) degrees.

In this embodiment, the tilting angle of the fixed area corresponding to an upper side of the photographed area of the virtual imaging device is fixed to the reference angle, it is possible to minimize distortion of a vertical object on a photographed image, minimize bending of a line component in a horizontal direction, and widen a field of vision of the outer portion.

When setting the tilting angle of the variable area, the tilting-angle setting unit 16 allows the tilting angle of the variable area which is classified into the plurality of areas to be increased from the upper side of the variable area to the lower side thereof. Accordingly, since the tilting angle of the variable area corresponding to the lower area of the photographed area of the virtual imaging device becomes increased toward a lower side from the horizon, a wide viewing angle can be ensured at a short distance.

As an example, assuming that the reference angle is 0 (zero) degree, and the variable area is classified into three areas, wherein the uppermost area is a first area, a area below the first area is a second area, and the lowermost area is a third area, the tilting angle of the fixed area may be fixed to 0 (zero) degree and in the variable area, the first to third areas may be set to 5 degrees, 11 degrees, and 18 degrees, respectively. The maximum tilting angle may be equal to or larger than 18 degrees and the tilting angle may be changeable depending on the characteristic value of the imaging device provided in the rear of the vehicle.

The correction model generating unit 17 generates a correction model according to the tilting angles of the photographed areas, which is previously set by the tilting-angle setting unit 16. Since the tilting angle of the fixed area is fixed to the reference angle which is 0 degree, the tilting angle of the variable area becomes large toward the lower side, the correction model has a cylindrical shape of which the lower side is curved. When the reference angle is below 0 (Zero) degrees, the correction model may have a cylindrical shape of which the upper side and the lower side may be curved. The detailed example of the correction model is referred to FIG. 3.

The image correction unit 18 may perform, by the processor, view conversion on the image photographed through the rear imaging device 1 by applying the photographed image through the rear imaging device to the correction model generated by the correction model generating unit, and may generate, by the processor, a corrected image. Furthermore, the image correction unit 18 may control, by the processor, the virtual imaging device generated corresponding to the rear imaging device 1 based on the correction model. Under control of the image correction unit 18, the virtual imaging device may be tilted, by the processor, according to the tilting angles for the photographed areas such that the corrected image for the photographed areas can be obtained.

For example, under the assumption that the reference angle is 0 (zero) degrees, the maximum angle may be 25 degrees, when the image photographed through the rear imaging device 1 is classified into six areas in a vertical direction.

Furthermore, the virtual imaging device may perform a view conversion on a first area and a second area by setting the tilting angle to 0 (zero) degrees, on a third area by setting the tilting angle to 5 degrees, on a fourth area by setting the tilting angle to 11 degrees, on a fifth area by setting the tilting angle to 17 degrees, and on a sixth area by setting the tilting angle to 25 degrees, respectively. Accordingly, the image correction unit 18 may obtain, by the processor, a corrected image on the six areas.

The corrected image obtained in the image correction unit 18 may be output, by the processor, to the display unit 5 of the vehicle through the image output unit 13. The driver may correctly view the rear of the vehicle through the corrected image shown on the display unit 5.

Figure 2:
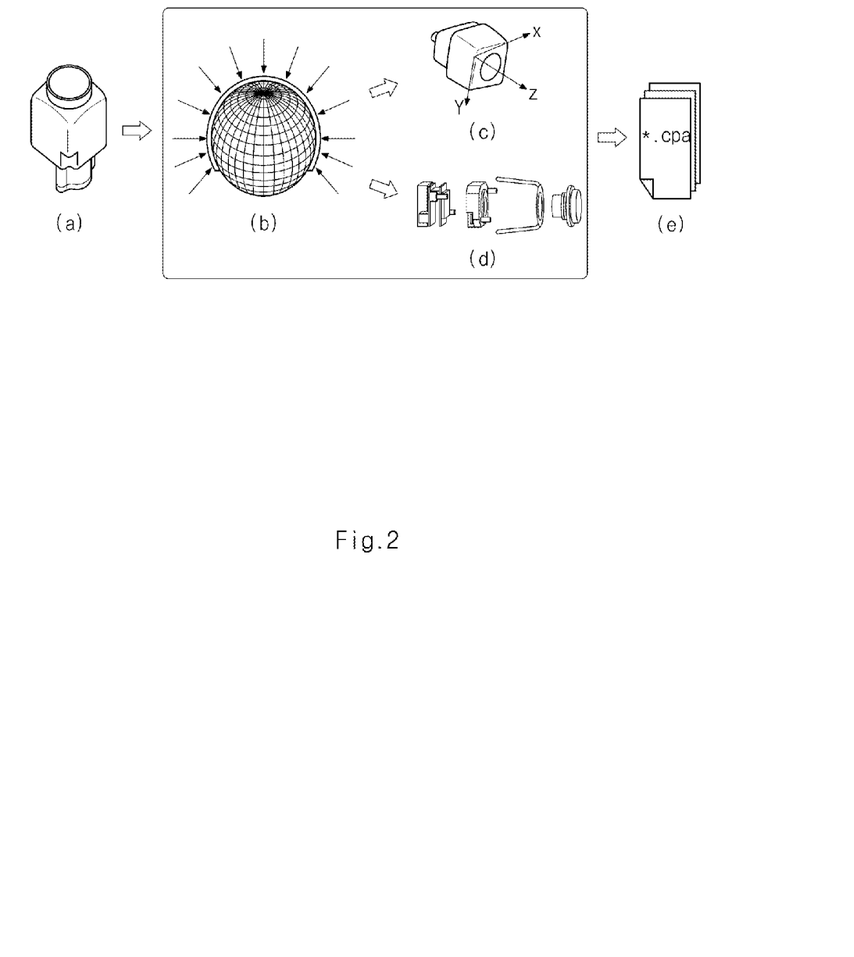
FIG. 2 is an exemplary view illustrating an operation of extracting a characteristic value of a rear imaging device according to an exemplary embodiment of the present invention.

FIG. 2 is an exemplary view explaining operation of extracting a characteristic value of a rear imaging device according to an exemplary embodiment.

Referring to FIG. 2, (a) illustrates the rear imaging device installed in the rear of the vehicle. The image distortion correction apparatus, based on a mathematical model illustrated in (b), may analyze, by the processor, a characteristic of the rear imaging device 1 of (a) according to an installation location of the imaging device and a position information, shown in (c). In addition, the image distortion correction apparatus may analyze a characteristic of the sensor and the lens of the wide-angle imaging device, shown in (d).

The image distortion correction apparatus may extract, by the processor, a characteristic value of the imaging device, shown in (e) based on the analysis results of the position information and the sensor and the lens characteristic. The characteristic value depending on the installation location and the position information of the imaging device may include coordinate information (x, y, z) and photographed direction information and the like. The characteristic value of the sensor and the lens of the imaging device may include an angle of view of the lens, a focal distance, an optical central point information, and the like.

Figure 3:
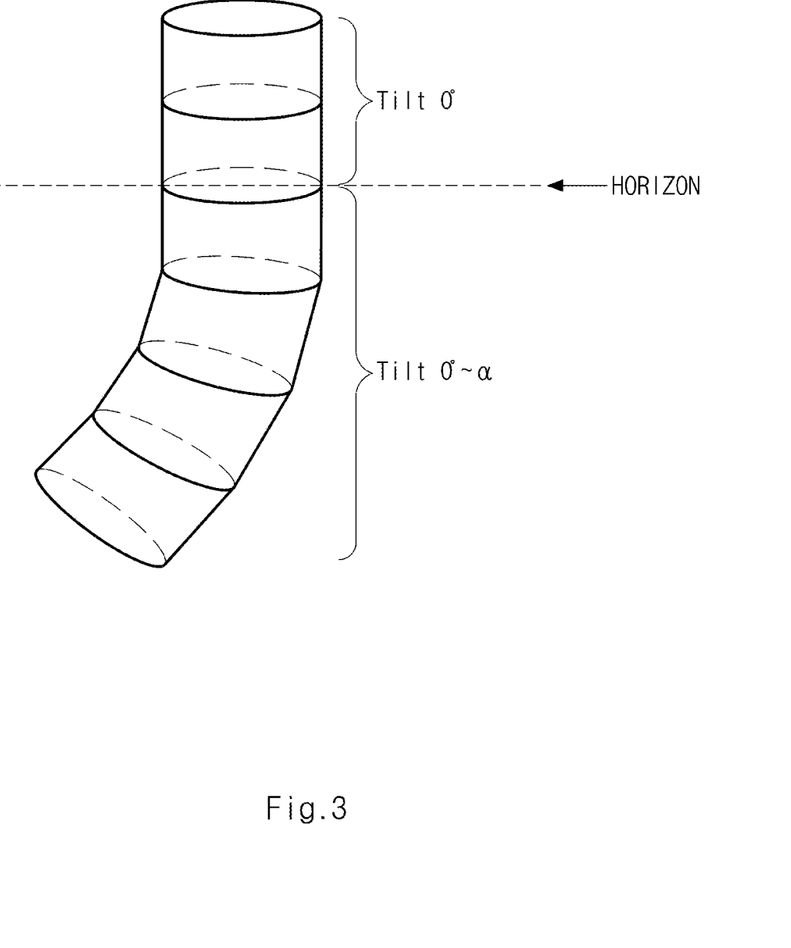
FIG. 3 is an exemplary view illustrating a correction model according to an exemplary embodiment of the present invention.

FIG. 3 is an exemplary view illustrating an example of a correction model according to exemplary embodiment.

Referring to FIG. 3, the corrected model may be a cylindrically shaped model, and may have a shape in which a lower side is curved by setting the reference angle to 0 (zero) degrees. In other words, the image distortion correction apparatus may set, by the processor, the tilting angles for the photographed areas of the virtual imaging device so the tilting angle of the fixed area is set to the reference angle of 0 (zero) degrees, and the variable area is set within a range from 0 degrees and to a maximum angle of α degrees.

Moreover, the variable area may be further classified, by the processor, into a plurality of areas having different tilting angles for the areas so the tilting angle may be set to be substantially large from an upper side of the variable toward a lower side thereof. For example, under an assumption that the maximum angle α is 25 degrees, the variable area may be classified into four photographed areas, and tilting angles of a first area, a second area, a third area, and a fourth area, from the upper side of the variable area to the lower side thereof, may be set to 0 (zero) degrees, 5 degrees, 15 degrees, and 25 degrees, respectively. Accordingly, since the tilting angle of the correction model may have a slope increasing from the horizon toward the lower side of the variable area, the correction model may have a cylindrical shape in which the lower side is curved. When the reference angle is set to below 0 degrees as described above, the correction model may have a cylindrical shape in which the upper side and the lower side are curved.

The correction model may have a shape which classified according to the photographed areas of the virtual imaging device, and a setting value may be stored by the processor in the memory, for example, the pixel value, the tilting angle, and the like of each photographed area corresponding to the areas may be stored as the setting value.

Figure 4:
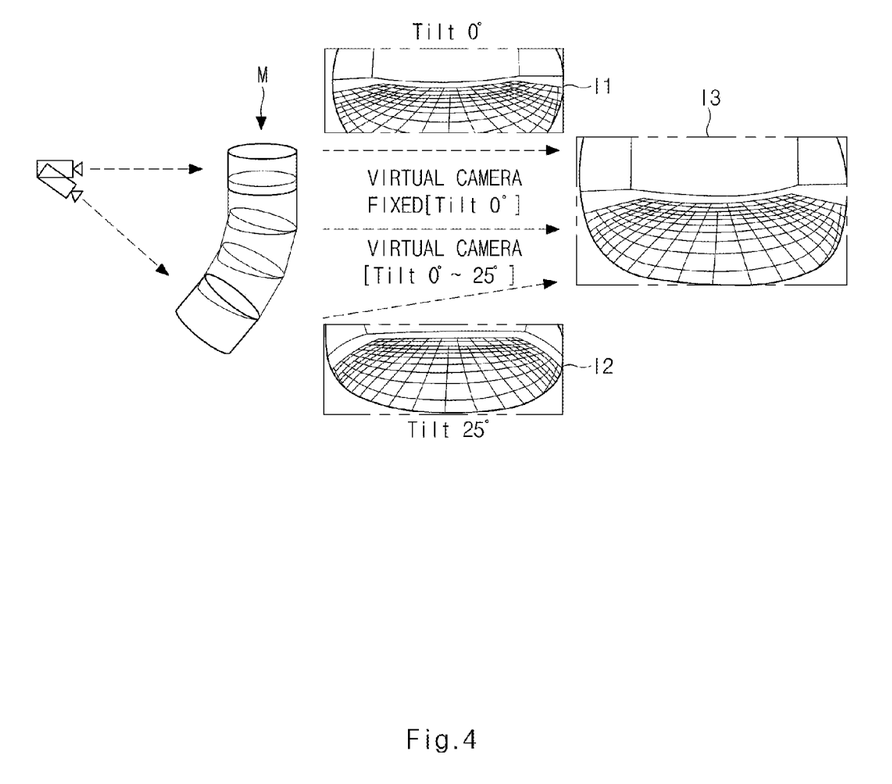
FIG. 4 is an exemplary view illustrating an example of performing view conversion of a photographed image by applying a correction model according to an exemplary embodiment of the present invention.

FIG. 4 is an exemplary view illustrating an example of performing view conversion on photographed areas applying a correction model illustrated in FIG. 3.

Referring to FIG. 4, when the image is photographed through the rear imaging device, the image distortion correction apparatus may tilt, by the processor, the virtual imaging device and may perform a view conversion on a photographed area based on the correction model M of FIG. 3.

For example, under the assumption that from the upper side toward the lower side in the variable area, the tilting angles of the first area to the fourth area are set to 0 degrees, 5 degrees, 15 degrees, and 25 degrees, respectively, the virtual imaging device may perform a view conversion on the image corresponding to the fixed area of the photographed image so area may have a tilting angle of 0 degrees based on the correction model M.

Moreover, the virtual imaging device may perform, by the processor, a view conversion on the image corresponding to the first area of the variable area in the photographed image so a slope of the image corresponding to the first area becomes 0 (zero) degrees based on the correction model M. In addition, the virtual imaging device may perform a view conversion on the plurality of images corresponding to the second area to the fourth area of the variable area in the photographed image so the plurality of slopes of the images corresponding to the second area to fourth area become 5 degrees, 15 degrees, and 25 degrees, respectively, based on the correction model M.

Accordingly, the image distortion correction apparatus may obtain, by the processor, the corrected image, which may be a final image on the fixed area and the first area to the fourth area of the variable area in the photographed image.

Figure 5:
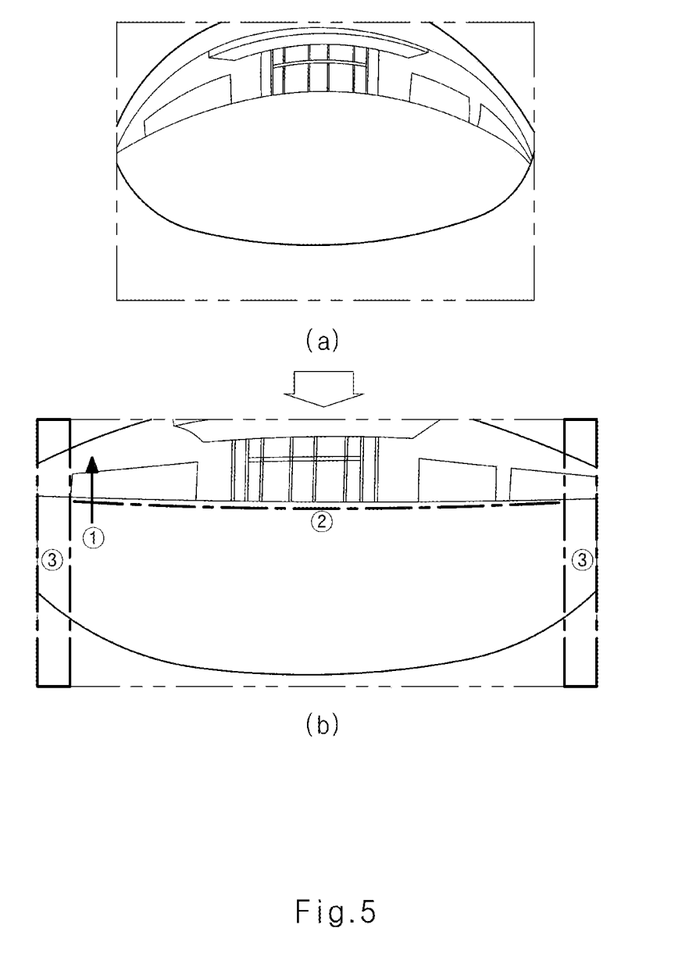
FIGS. 5 and 6 are exemplary views illustrating examples of correcting distortion of a photographed image by applying a correction model according to an exemplary embodiment of the present invention.
Figure 6:
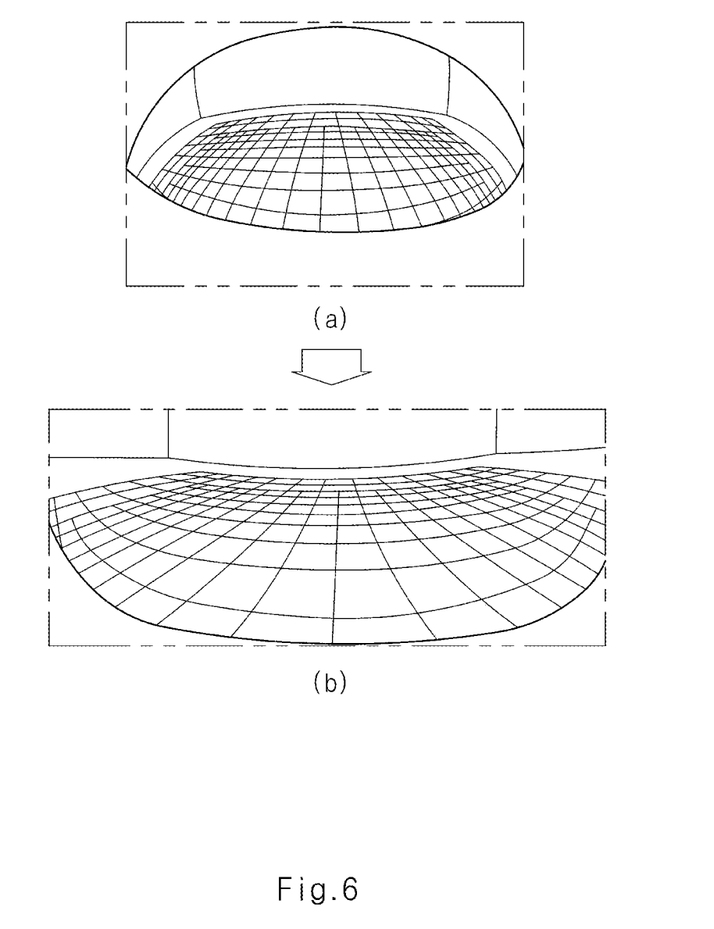

FIGS. 5 and 6 are exemplary views illustrating examples of correcting distortion of a photographed image by applying a correction model according to exemplary embodiments.

Referring to FIGS. 5 and 6, (a) illustrates an original image photographed through the rear imaging device and (b) illustrates a corrected image of the original image. Moreover, FIG. 5 illustrates detailed correction items of the corrected image.

As shown in (a) of FIGS. 5 and 6, often the object in the original image may be a vertical object (e.g., a person, a safety leg, a tripod, and the like) with respect to the ground or bottom surface. However, due to the characteristic of the wide-angle lens, the original image may display an object in a tilted or curved position. Additionally, often the boundary line of the ground, that is, the horizon, is a straight line in a horizontal direction. However, due to the characteristic of the wide-angle lens, a horizon which is curved from the central portion toward the right and left sides may be displayed.

In this embodiment, the field of view of the central portion may be captured. However, since the fields of view of the right and left ends may be narrow in an image taken by a wide-angle range, the driver may not view an accurate depiction of the rear surroundings. Accordingly, the image distortion correction apparatus may generate, by the processor, the correction model for correcting shapes and locations of the vertical object, the horizon, and the like.

In other words, the image distortion correction apparatus may classify, by the processor, the photographed area of the virtual imaging device corresponding to the rear imaging device into a plurality of areas, and may set the tilting angle for the photographed areas based on the characteristic value of the rear imaging device, that is, the characteristic value by the location and the position, and the optical characteristic value.

As a result, the image distortion correction apparatus may tilt, by the processor, the virtual imaging device corresponding to the rear imaging device depending on the correction model and may perform a view conversion on the original image for the photographed areas to obtain the distortion-corrected image as shown in (b) of FIGS. 5 and 6.

Moreover, the image distortion correction apparatus may set, by the processor, the different tilting angles for the photographed areas of the virtual imaging device in the correction model. In particular, the image distortion correction apparatus may set the tilting angle of the fixed area to correspond to the reference angle. Thus, the image distortion correction apparatus may obtain, by the processor, the corrected image in which the tilting angle, the curvature of the vertical object, the horizon, and the like within the fixed area are considered. As shown in (b) of FIG. 5, an object may be vertical as indicated by ①, and the horizon may be corrected in a substantially linear line in a horizontal direction indicated by ②.

The image distortion correction apparatus may set, by the processor, the tilting angle of the fixed area to correspond to the reference angle and may set the tilting angle of the variable area which is the lower area to a value in a range from the reference angle to the maximum angle. In other words, the image distortion correction apparatus may set the tilting angle of the variable area to increase from an upper side of the variable area toward a lower side thereof to obtain a wide angle of view. As shown in (b) of FIG. 5, the original image may be corrected sot the fields of view of the left and right outer portions are widened as indicated by ③. In this embodiment, it may be possible to provide the driver with an image of a wide range, thereby minimizing the dead zone.

Accordingly, the driver may accurately view the rear surroundings through the corrected image illustrated in FIGS. 5 and 6.

Hereinafter, a method of the image distortion correction apparatus of a rear imaging device having the above-described configuration according to an exemplary embodiment will be described in more detail.

Figure 7:
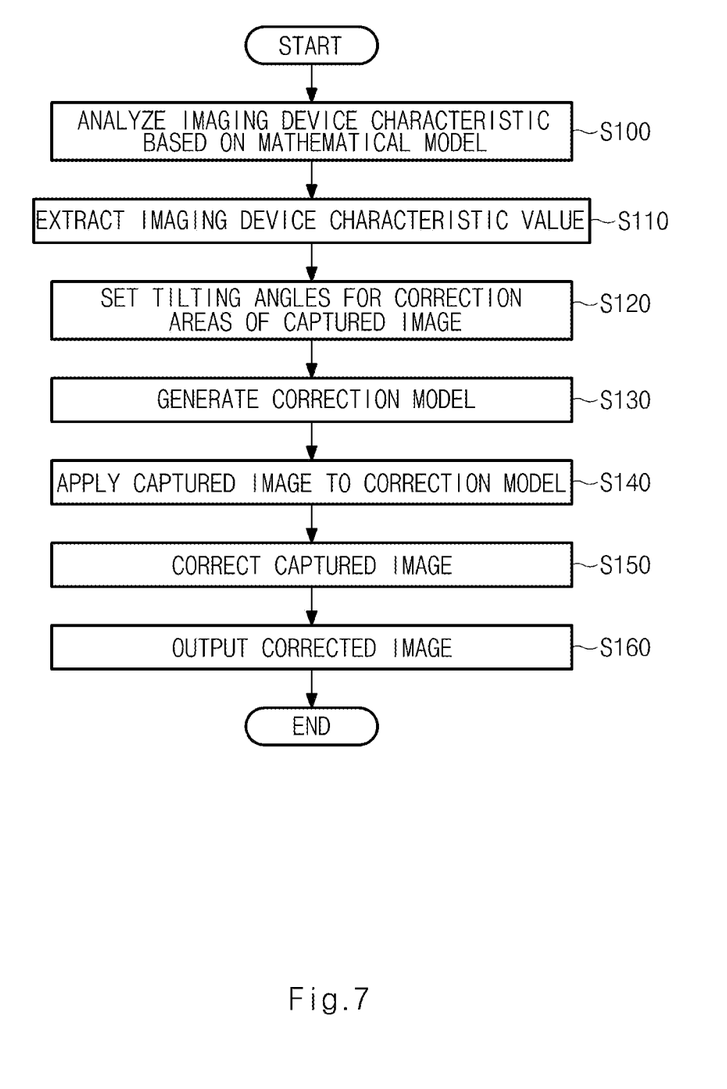
FIG. 7 is an exemplary flowchart illustrating a method for correcting image distortion of a rear imaging device according to an exemplary embodiment of the present invention.

FIG. 7 is an exemplary flow chart illustrating a method for correcting image distortion of a rear imaging device according to an exemplary embodiment.

Referring to FIG. 7, the image distortion correction apparatus of the rear imaging device according to an exemplary embodiment may analyze, by a processor, a characteristic of the imaging device installed in a rear of a vehicle based on a preset mathematical model (S100) and may extract the characteristic value for the rear imaging device (S110). Furthermore, the process in step S100 may analyze, by the processor, an installation characteristic according to the imaging device installation location and the direction and optical characteristic for equipment such as the wide-angle lens, the sensor, and the like. Accordingly, the process in step S100 may extract the characteristic value of the imaging device for calculating a view-converted angle for the areas on the original image.

Subsequently, the image distortion correction apparatus may set, by the processor, a plurality of tilting angles of the photographed areas of the virtual imaging device corresponding to the rear imaging device by applying the characteristic values of the imaging device extracted in step S110 (S120).

Furthermore, the tilting angles of the photographed areas of the virtual imaging device may an angle which is tilted toward the upper side direction (−) or lower side direction (+) from the horizon when the direction parallel to the horizon is set to 0 (zero) degree. In addition, the process in step S120 may set, by the processor, the tilting angle of a fixed area to a reference angle, and may set the tilting angle of a variable area to a value within a range from the reference angle and a preset maximum angle under a state in which the photographed area of the virtual imaging device is classified into the fixed area and the variable area based on the reference angle. In particular, when setting the tilting angle of the variable area, the variable area may be classified, by the processor, into a plurality of areas in a vertical direction and thus the tilting angle may be set to increase from the upper side of the variable area toward the lower side thereof.

The image distortion correction apparatus may generate, by the processor, a correction model for correcting the photographed image by applying the tilting angles for the photographed areas of the virtual imaging device calculated in step S120 (S130).

Accordingly, the image distortion correction apparatus may correct, by the processor, the distortion of the photographed image of the imaging device by applying the photographed image of the imaging device to the correction model generated in step S130 (S140). The image distortion correction apparatus may tilt, by the processor, the virtual imaging device according to the photographed areas based on the correction model, and performed view conversion on the photographed image for the photographed areas by tilting the virtual imaging device. Thereby correcting the photographed image (S150).

Subsequently, the image distortion correction apparatus may display, by the processor, the corrected image obtained in step S150 through a display unit disposed in the vehicle (S160).

Although not illustrated in FIG. 7, the image distortion correction apparatus may further generate, by the processor, a compensation model for compensating a difference occurring when correcting the distortion of the photographed image in step S150, and may apply the corrected image to the compensation model to generate a final output image.

As described above, the apparatus and method for correcting image distortion of the rear imaging device according to the exemplary embodiment have been described with reference to illustrated drawings. However, the present invention is not limited by the exemplary embodiments disclosed in the specification and drawings, various alternatives and modifications, and variations within the scope and sprit of the invention will be apparent within protection coverage of the inventive concept.

The foregoing descriptions of exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims accompanying hereto and their equivalents.

What is claimed is:

1. An apparatus for correcting image distortion of a rear imaging device, the apparatus comprising:
   a processor configured to:
      analyze a characteristic of an imaging device installed in a rear of a vehicle;

set a plurality of tilting angles for a plurality of photographed areas of a virtual imaging device corresponding to the rear imaging device from the characteristic value of the rear imaging device;

generate a correction model by applying the plurality of tilting angles to the plurality of photographed areas of the virtual imaging device;

tilt the virtual imaging device based on the correction model;

perform a view conversion on a image photographed through the rear imaging device according to the plurality of set tilting angles for the plurality of photographed areas of the virtual imaging device to generate a corrected image; and output the corrected image.

2. The apparatus of claim 1, wherein each tilting angle is an angle tilted in an upward direction (−) or downward direction (+) from a horizon when a direction parallel to the horizon is set to 0 degrees.

3. The apparatus of claim 1, wherein the processor is further configured to:

set each tilting angle based on a preset reference angle;

fix each tilting angle for an upper fixed area to the reference angle; and set each titling angle for a lower variable area within a range from the reference angle to a preset maximum angle.

4. The apparatus of claim 3, wherein, in setting each tilting angle of a variable area, the processor is further configured to classify the variable area into a plurality areas in a vertical direction and increase each tilting angle from an upper side of the variable area toward a lower side thereof.

5. The apparatus of claim 1, wherein the correction model is a classified shape according to the plurality of photographed areas of the virtual imaging device.

6. The apparatus of claim 5, wherein the processor is further configured to apply in the correction model at least one setting value selected from a group consisting of: a pixel value and a tilting angle of the photographed area corresponding to each area.

7. The apparatus of claim 1, wherein the characteristic value of the imaging device is selected from at least one of a group consisting of: a position of the imaging device, a photographed direction, a focal distance for a lens of the imaging device, an angle of view, and an optical central point.

8. A method for correcting image distortion of a rear imaging device, the method comprising:

analyzing, by a processor, a characteristic of a imaging device installed in a rear of a vehicle;

setting, by the processor, a plurality of tilting angles of a plurality of photographed areas of a virtual imaging device corresponding to the rear imaging device from a characteristic value of the imaging device;

generating, by the processor, a correction model by applying the plurality of tilting angles of the plurality of photographed areas of the virtual imaging device;

tilting, by the processor, the virtual imaging device based on a correction model;

generating, by the processor, a corrected image by performing a view conversion on an image photographed through the rear imaging device according to the plurality of set tilting angles of the plurality of photographed areas of the virtual imaging device; and outputting, by the processor, the corrected image.

9. The method of claim 8, wherein each tilting angles is an angle tilted in an upward direction (−) or downward direction (+) from a horizon when a direction parallel to the horizon is set to 0 degrees.

10. The method of claim 8, wherein setting the plurality of tilting angles further includes:

fixing, by the processor, each tilting angle for an upper fixed area to a preset reference angle; and setting, by the processor, each titling angle for a lower variable area within a range from the reference angle to a preset maximum angle.

11. The method of claim 9, wherein, the setting tilting angles further includes:

classifying, by the processor, a variable area into a plurality areas in a vertical direction; and setting, by the processor, each tilting angle to increase from an upper side of the variable area to a lower side thereof.

12. A non-transitory computer readable medium containing program instructions executed by a processor, the computer readable medium comprising:

program instructions that analyze a characteristic of an imaging device installed in a rear of a vehicle;

program instructions that set a plurality of tilting angles for a plurality of photographed areas of a virtual imaging device corresponding to the imaging device from the characteristic value of the imaging device;

program instructions that generate a correction model by applying the plurality of tilting angles to the plurality of photographed areas of the virtual imaging device;

program instructions that tilt the virtual imaging device based on the correction model;

program instructions that perform a view conversion on a image photographed through the imaging device according to the plurality of set tilting angles for the plurality of photographed areas of the virtual imaging device to generate a corrected image; and program instructions that output the corrected image.

13. The non-transitory computer readable medium of claim 12, wherein each tilting angle is an angle tilted in an upward direction (−) or downward direction (+) from a horizon when a direction parallel to the horizon is set to 0 degrees.

14. The non-transitory computer readable medium of claim 12, wherein the computer readable medium further comprises:

program instructions that set each tilting angle based on a preset reference angle;

program instructions that fix each tilting angle for an upper fixed area to the reference angle; and program instructions that set each titling angle for a lower variable area within a range from the reference angle to a preset maximum angle.

15. The non-transitory computer readable medium of claim 12, wherein the computer readable medium further comprises program instructions that classify the variable area into a plurality areas in a vertical direction and increase each tilting angle from an upper side of the variable area toward a lower side thereof.

16. The non-transitory computer readable medium of claim 12, wherein the correction model is a classified shape according to the plurality of photographed areas of the virtual imaging device.

17. The non-transitory computer readable medium of claim 16, wherein the computer readable medium further comprises program instructions that apply in the correction model at least one setting value selected from a group consisting of: a pixel value and a tilting angle of the photographed area corresponding to each area.

18. The non-transitory computer readable medium of claim 12, wherein the characteristic value of the imaging device is selected from at least one of a group consisting of: a position of the imaging device, a photographed direction, a focal distance for a lens of the imaging device, an angle of view, and an optical central point.

* * * * *